Sept. 26, 1950 W. L. EFFINGER, JR 2,523,902
CONTROL MECHANISM FOR MODEL AIRPLANES
Filed June 2, 1943 2 Sheets-Sheet 1
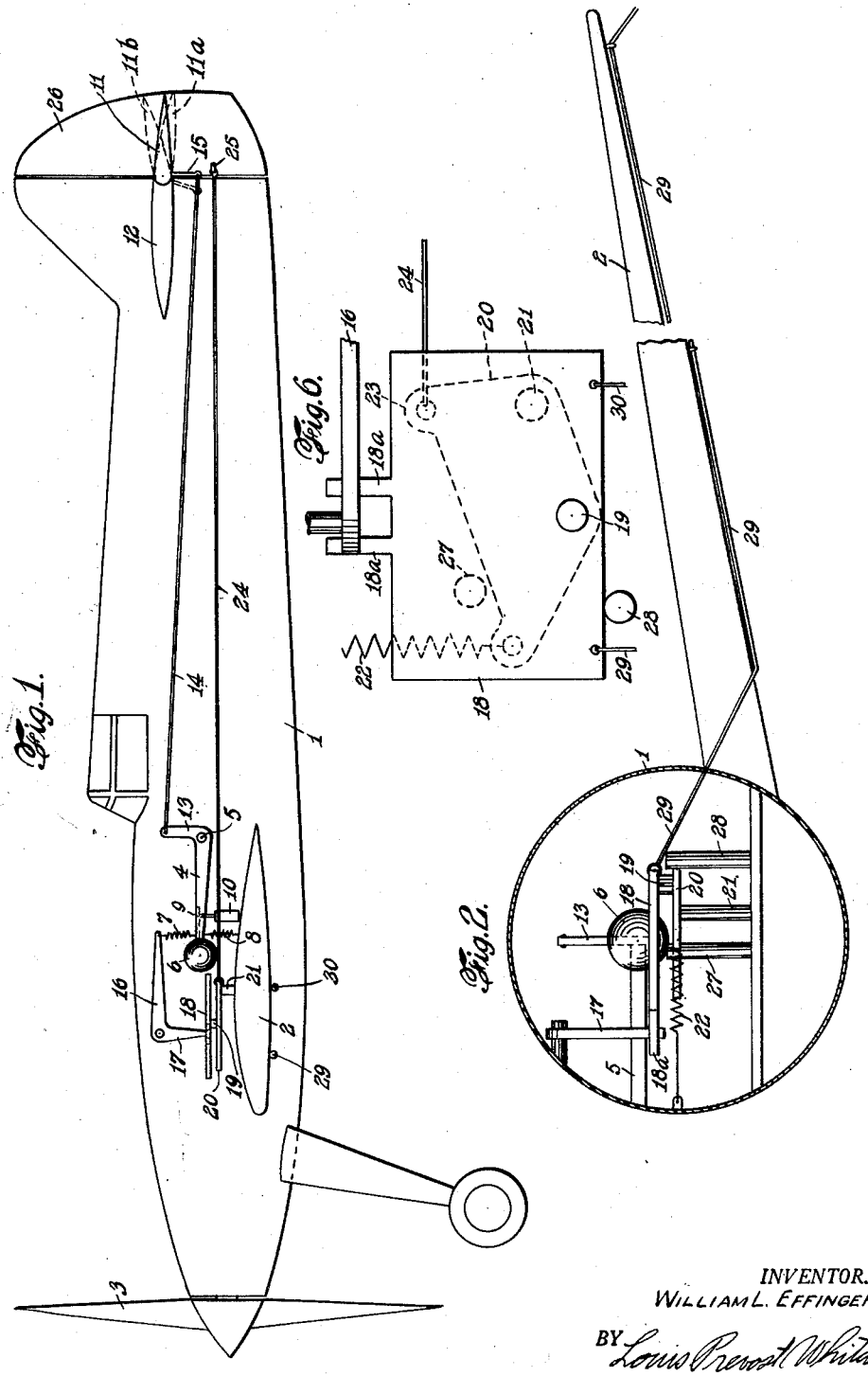
INVENTOR.
WILLIAM L. EFFINGER JR.
BY
ATTORNEY.

Sept. 26, 1950     W. L. EFFINGER, JR     2,523,902
CONTROL MECHANISM FOR MODEL AIRPLANES
Filed June 2, 1943     2 Sheets—Sheet 2
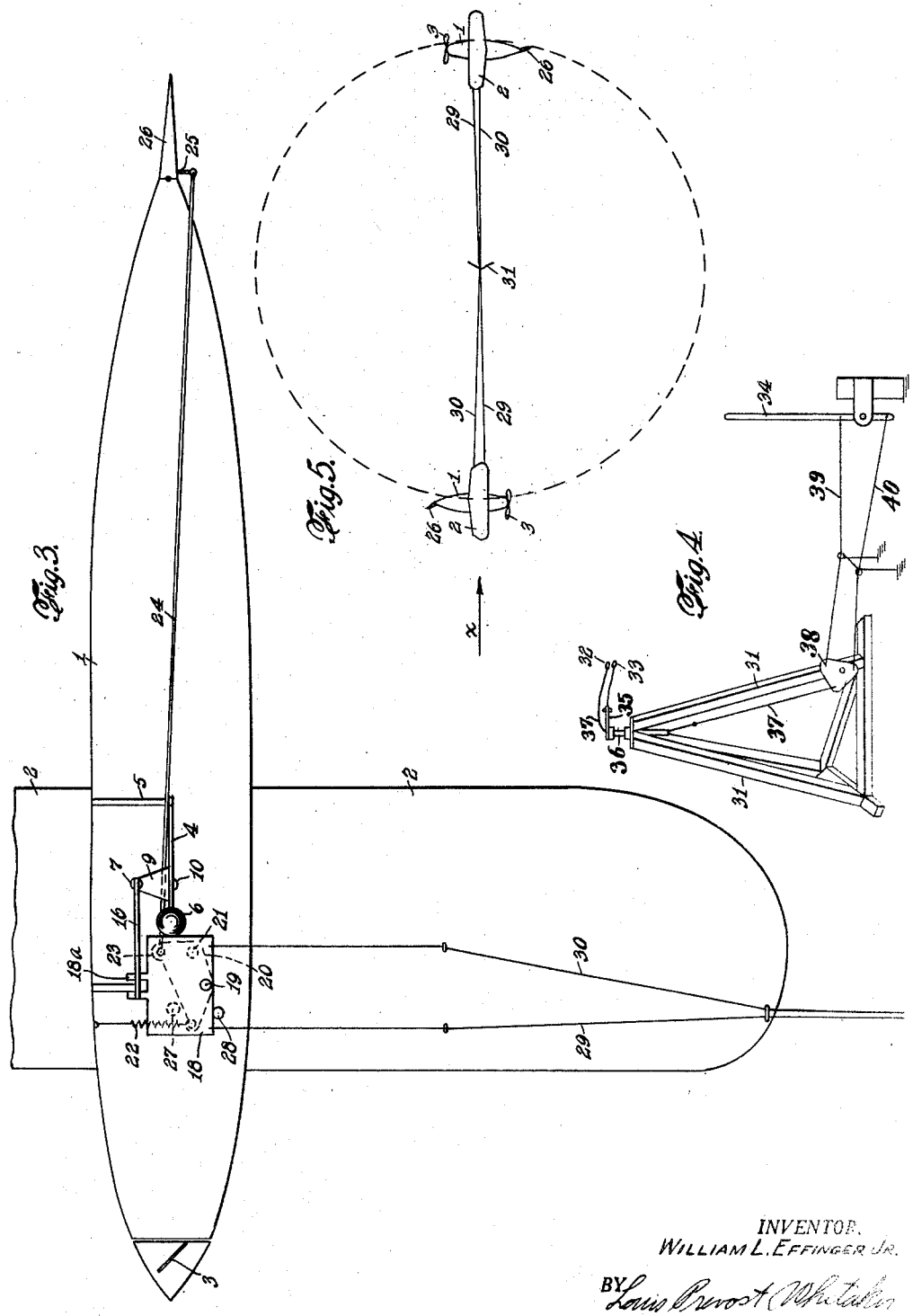
INVENTOR.
WILLIAM L. EFFINGER JR.
BY
ATTORNEY.

Patented Sept. 26, 1950

2,523,902

UNITED STATES PATENT OFFICE 2,523,902

CONTROL MECHANISM FOR MODEL AIRPLANES

William Louis Effinger, Jr., West Hempstead, N. Y.

Application June 2, 1943, Serial No. 489,335

24 Claims. (Cl. 46—77)

My invention consists in the novel features hereinafter described, reference being had to the accompanying drawings which illustrate one embodiment of the same, selected by me for purposes of illustration, and the said invention is fully disclosed in the following description and claims.

My present invention is an improvement in model aircraft and relates particularly to model airplanes, and it consists in the best form in which I have contemplated embodying my invention.

My invention relates more particularly to the means whereby a self-propelled model airplane is controlled while in flight, and consists primarily in inertia operated means whereby the usual controlling means, as for example, the elevating means or other controlling means, is automatically controlled so that variations in the flight level may be checked and the model plane maintained at a desired level in flight, while the elevating mechanism or other controlling means may also be subject to adjustment by the operator on the ground, when desired.

In the practical manufacture and operation of self-propelled model airplanes, it has been customary to employ control lines connected with the control elements of the plane, extending to the ground where they were connected with a device, or devices, adapted to be held in the hand of an operator and manipulated in such manner as to vary the positions of the control means carried by the plane to produce the desired guiding or controlling effect on the flight of the plane, its gyrations under the effect of sudden gusts of wind, etc. Such airplane models have, however, been more recently provided with more and more motive power, until the speeds which the planes attain are frequently so great that it is practically impossible to exercise the desired control of their flight by movements of the operator's hands acting on the usual control lines.

In carrying out my invention the control elements of the plane are operatively connected with an inertia element, as a weight located in the fuselage, as near the center of gravity of the plane as possible and movable vertically with respect thereto, preferably in connection with counterbalancing springs or other dampening means, and a dash-pot, whereby sudden movements of the plane in flight will be instantly corrected by the movement of the weight, and a uniform line of flight may be maintained. I prefer to employ the usual control lines which are connected with the inertia control apparatus so that the operator may control the flight of the plane and vary the same as he may desire, leaving it otherwise under the control of the inertia element.

In the accompanying drawings,

Fig. 1 is a more or less diagrammatic view, in side elevation, of a model airplane, the propelling motor of which may be of any desired or usual form or design, being omitted, and showing my present invention embodied therein.

Fig. 2 is a partial view of the plane in cross section showing the fuselage and one wing, the latter being partially broken away.

Fig. 3 is a partial top plan of the plane showing the control apparatus.

Fig. 4 illustrates a conventional form of pylon showing a control stick for operating the control lines.

Fig. 5 is a horizontal diagrammatic view illustrating the circular line of flight of the model plane, here shown in two positions with respect to the wind direction indicated by the arrow X, and illustrating the automatic shifting of the rudder of the plane to maintain it in a uniform circular line of flight around the pylon.

Fig. 6 is an enlarged view of the controlling plates and their operative connections.

In the drawings, I represents the fuselage of a model airplane provided with the usual wings 2, and having the usual driving propeller 3 operatively connected with any suitable source of power (not shown) and operating in the usual manner to propel the model plane.

Within the fuselage I provide an inertia lever 4 pivoted for vertical movement at 5, and provided with a weight 6. The lever 4, which is located as near to the center of gravity of the plane as possible, is provided with counterbalancing or dampening springs 7 and 8, in this instance connected to a plate 9 extending laterally from the lever 4, one of said springs 8 being connected to the fuselage and the other to the arm 16 of a bellcrank, as hereinafter described. 10 represents a dash-pot of any usual or desired form, or other cushioning means, operatively connected with the lever 4, in this instance being interposed between a fixed point in the fuselage and the plate 9, to further cushion the movements of the inertia weight and its lever 4. The lever 4 is provided with means for connecting it with the hinged or movable portion 11, forming the stabilizer, the stationary part 12 of which is secured rigidly to the fuselage. In this instance I have shown the lever 4 provided with a crank arm 13 which is connected by a link or rod 14 to an arm 15 extending laterally from the movable portion of the horizontal stabilizer 11.

The end of the spring 7, remote from the plate 9, is connected to one end of a bellcrank lever 16 pivotally mounted in the fuselage and having an arm 17 extending downwardly and operatively connected with a horizontal plate 18 (see Figs. 3 and 6) pivotally supported by a pivot 19. In this instance the plate 18 is provided with separated projections 18a between which the arm 17 extends.

The plate 18 is provided with a parallel plate 20, shown in dotted lines in Fig. 3, to which it is pivotally connected by the pivot 19. The plate 20 is independently connected to the fuselage by a pivot 21 and is provided with a movable portion, indicated at 23, connected by a link 24 to a steering arm 25, operatively connected with the vertical rudder 26 for effecting the steering of the plane in horizontal directions. The portion of the plate 20 is connected with a spring 22 secured at its opposite end to the fuselage and a tapered portion of said plate 20 is movable between two stops, indicated at 27 and 28, independent of plate 18, which limit the movements of the plate 20 (see Figs. 3 and 6) in either direction on its pivot 21 with respect to the plate 18. The control lines, indicated at 29 and 30, are connected to the plate 18 at separated points (as shown in Fig. 3) and extend to the ground where they can be manipulated by the operator in any usual or desired manner to rock the plate 18 on its pivot 19.

I prefer to employ a pylon, indicated in Fig. 4 at 31, having connections 32, 33, for engaging the control lines, said connections being operatively connected with a pivoted stick 34, in a well known way, so that a rearward movement of the stick will effect an upward movement of the plane, and a forward movement of the stick will produce a downward movement of the plane. Thus line 29 is connected through connection 33 to an arm 35 which is swingable about a stationary tube 36, while line 30 is connected by connection 32 with a line 37 that extends down through tube 36 and is connected with a rocker plate 38. The rocker plate 38 is connected by lines 39 and 40 with the pivoted control stick 34, as shown. The operator, by moving the stick 34 in one direction or the other can oscillate the plate 18 on its axis 19 and effect a manual control of the movable elevator 11, as hereinafter described.

The operation of the plane will be as follows. Assuming that the plane is in flight in a circular path around the operator or pylon, as indicated in Fig. 5, it will be maintained at the desired level automatically by means of the inertia devices before described. If it should tend to soar, due to wind or otherwise, the upward tilt of the fuselage will cause the weight 6 to lower with respect to the fuselage, thereby depressing the elevator 11, as indicated in dotted lines at 11a, and causing the plane to dip sufficiently to bring it back upon its former course. Likewise, if the plane should dip, the effect of the stabilizing weight would act on the elevator in the opposite direction, as indicated at 11b, so as to cause the plane to fly upwardly and thus restore it to its former path. In either case the inertia weight will be shifted to its normal position so as to maintain the plane on a horizontal line of flight.

It will also be understood that the operator can manually cause the plane to alter its course, by dipping or soaring, by means of the control lines 29, 30, if he desires. For example, if the operator manipulates the control lines so as to rock the plate 18 in a counterclockwise direction, this movement of the plate will, through the bellcrank 17, 16, relieve the spring 7 and by thus varying the bias on the spring, will permit the weight to lower, thus moving the elevator to effect a downward movement of the plane. A shifting of the lines 29, 30 to rock plate 18 in the opposite direction will effect an upward movement of the plane.

When the plane is in circular flight around the operator or pylon, as indicated in Fig. 5, the control lines will ordinarily be taut and there will be no relative movement between them when the plane is in normal flight. Should the plane be subjected to a strong wind from the direction indicated by the arrow x in Fig. 5, this would tend to cause the plane to swerve toward the pylon, which would obviously cause the tension on the control lines 29 and 30 to slacken, thus relieving the tension of spring 22 on the plate 20. The spring 22 would rock the plate 20 on its pivot 21 and cause it to operate the link 24 and arm 25, thus moving the vertical rudder 26 in a direction (to the right in Fig. 5) so as to direct the plane outwardly and keep it in its circular line of flight with respect to the operator (or pylon). Likewise, assuming the same wind conditions, if the plane is on the leeward side of the operator (or pylon), the tension on the control lines will be increased, thus overcoming the tension of spring 22 more or less and effecting a movement of the rudder to the left (Fig. 5), thus directing the plane to the left and relieving the strain on the control lines and maintaining the plane in its circular path.

These operations of the rudder are automatic and it is practically impossible otherwise to control the flight of the plane in a circular path when a wind is blowing. It will be understood, however, that the rudder may be similarly operated at any time by the operator, by relieving the tension of the control lines, or increasing the tension thereon, so that the steering of the plane may be accomplished either automatically or manually and without causing the plane to rise or fall. Likewise, by pulling on one or other of the control lines 29 or 30, the plane may be caused to rise or fall manually or automatically as hereinbefore described without changing its course horizontally.

What I claim and desire to secure by Letters Patent is:

1. In a model airplane, having controlling means mounted thereon, and controlling lines therefor extending to the ground under control of an operator, an inertia device movably supported in the plane, and operatively connected with said controlling means for automatically operating said controlling means concurrently with the control by said control lines.

2. In a model airplane, having controlling means mounted thereon, and controlling lines therefor extending to the ground under control of an operator, a weight pivotally supported in said plane, dampening means therefor, and operative connections between said weight and the said controlling means for automatically operating said controlling means concurrently with the control by said controlling lines.

3. In a model airplane, having controlling means mounted thereon, and controlling lines therefor extending to the ground under control of an operator, an inertia device movably supported in the plane and operatively connected with said controlling means, and dampening means for said inertia device whereby said inertia device will automatically operate the said controlling means concurrently with the control by said controlling lines.

4. In a model airplane, having controlling means mounted thereon, controlling lines therefor extending to the ground under control of an operator, an inertia device movably supported in the plane, and operative connections between said controlling lines, inertia device and controlling means for manually operating said controlling means, while they are under the control of said inertia device.

5. In a model airplane, having a controlling elevator, and controlling lines operatively connected with said elevator and extending to the ground for manually controlling said elevator, an inertia device movably supported in the plane and operatively connected with said elevator for automatically controlling the same, the control exerted by said inertia device and that effected by said control lines being superimposed on one another.

6. In a model airplane having a controlling elevator, an inertia lever pivotally mounted in the plane said lever being operatively connected with said elevator, and provided with a weight, dampening means for said weight, and controlling lines extending to the ground and operatively connected with said weight whereby said elevator may be controlled manually or automatically.

7. In a model airplane having a controlling elevator and a rudder, an inertia device movably mounted in the plane and operatively connected with said elevator, controlling lines extending from said plane to the ground, a movable device on said plane operatively connected with said inertia device, and with said controlling lines, and operative connections between said movable device and said rudder for operating said elevator automatically or manually independently of the rudder and for operating said rudder either automatically or manually independently of the elevator.

8. A model airplane provided with control elements including a horizontal elevator, and a vertically disposed rudder, an inertia device operatively connected with one of said control elements for operating it automatically, a pivoted part operatively connected with said inertia device for operating it manually, ground lines connected with said pivoted part for manually controlling the inertia device and the control element controlled thereby, a secondary pivoted part pivotally connected with the first mentioned pivoted part, a spring for moving said secondary part in one direction against the tension of said ground lines, and operative connections between said secondary part and the other of said control elements on the plane.

9. A model airplane provided with control elements including a horizontal elevator and a vertical rudder, of a pivoted inertia lever connected to one of said control elements, and provided with a weight, dampening springs for said weight, a pivoted part, ground lines connected at separated points thereto, operative connections between said pivoted part and one of the said dampening springs for operating said inertia device and the control element connected therewith by means of said ground lines, a secondary pivoted part pivotally connected to said first mentioned pivoted part, and operatively connected to the other of said control elements, and a spring acting on said secondary part in opposition to the direction of pull thereon by the ground lines, through its connection with said first mentioned pivoted part.

10. A model airplane having an elevator and a vertically disposed rudder, an inertia lever pivoted in the plane and operatively connected with the elevator, an inertia weight connected with said lever, dampening springs for said lever, a bellcrank lever having one arm connected with and supporting one of said dampening springs, a pivoted plate connected with the other arm of said bellcrank lever, and ground lines connected to said plate on opposite sides of its pivot for rocking said plate to manually control said elevator.

11. A model airplane having an elevator and a vertically disposed rudder, an inertia lever pivoted in the plane and operatively connected with the elevator, an inertia weight connected with said lever, dampening springs for said lever, a bellcrank lever having one arm connected with and supporting one of said dampening springs, a pivoted plate connected with the other arm of said bellcrank lever, and ground lines connected to said plate on opposite sides of its pivot for rocking said plate to manually control said elevator, a secondary plate pivotally connected to said first mentioned pivoted plate, and adapted to be drawn in one direction by the equal pull of said ground lines on the first mentioned plate, a counterbalance spring connected to said secondary plate to normally counterbalance the pull of the ground lines, and operative connections between the said secondary plate and the vertical rudder.

12. A model airplane provided with an elevator and with a vertical rudder, and having an inertia device operatively connected with said elevator, a pivotally movable control plate operatively connected to said inertia device, a secondary control plate operatively connected with said rudder, and pivotally connected with said first mentioned control plate, spring means connected with said secondary control plate for moving it pivotally with respect to said first mentioned plate, and controlling lines extending to the ground and connected at separated points with said first mentioned control plate, and adapted to be placed under tension by the operator to counterbalance said spring, whereby said elevator may be operated automatically, by said inertia device, or manually, by said control lines, and whereby said rudder may be operated automatically or manually by said spring by variations in the tension of said control lines.

13. A model airplane provided with control surfaces including a horizontal elevator and a vertically disposed rudder, a control element movably mounted in said airplane and operatively connected with said elevator and said rudder, control lines connected with said control element and extending from said airplane to the ground to control said elevator, and a spring for moving said control element in a direction opposite to the direction of pull of said control lines, the connections between said control element and the rudder being such that an increased pull on said control lines will act to turn the airplane toward the direction of said pull.

14. A control device for use with a machine having two units requiring independent operation, said units being operated by tension transmitted through two control lines manipulated by an operator, said device comprising means on said machine connected to said control lines and to both of said units for operating one of the units responsive to differential movement of said control lines and for operating the other of said units responsive to abnormal tension in said control lines.

15. In a self propelled miniature airplane having an elevator and a rudder, a laterally movable arm on the craft, means connecting the arm to the rudder for simultaneous movement, a yieldable member connected to the arm and normally holding said arm and the rudder in one position, a control line connected to the arm for confining the line of flight of the airplane to an approximately circular course, said control line when taut being effective to hold said arm and the rudder in another position and means on the arm connected with the elevator and to which said line is connected through which the elevator may be controlled by the operator.

16. A control device for use with a model airplane having two units requiring independent operation, said units being operated by tension transmitted through two control lines manipulated by an operator, said device comprising a first member pivotally supported on said airplane for rocking movement relative thereto and connected to one of said units to operate the same by such rocking movement, a second member pivotally supported on said first member for movement therewith and for rocking movement relative thereto, said second member being connected to the other of said units to operate the same by said rocking movement relative to the first member, said control lines being attached to said second member for rocking the same relative to said first member when the lines are pulled differentially and for rocking the first member when said lines are pulled together, and means for yieldingly resisting the rocking movement of said first member.

17. A control device for use with a model airplane having movable elevators and a movable rudder, said elevators and rudder being operated by tension transmitted through two control lines manipulated by an operator, said device comprising control means on said airplane connected to said control lines and to said elevators for operating the same responsive to differential movement of said control lines, and said control means being connected to said rudder for operating the same responsive to abnormal tension in said control lines.

18. A control device for use with a machine having two units requiring independent operation, said units being operated by tension transmitted through two control lines manipulated by an operator, said device comprising a control member which is connected to said control lines and is angularly movable by differential movement of said control lines to operate one of said units, and bodily movable by tension in said control lines to operate the other of said units.

19. In a self propelled miniature airplane having an elevator, means for moving the elevator to control the elevation of the airplane, said means comprising a laterally movable member on the craft, a rotatable element on said member, means operatively connected with the elevator and arranged to be moved by said rotatable element as it rotates to move the elevator, and a flexible control line under the control of the operator on the ground and connected to said element to rotate it.

20. In a self-propelled miniature aircraft having a rudder and an elevator, means for yieldingly holding the rudder in one position, a control line connected to said means and through which the rudder may be moved to another position, a rotary element associated with the holding means and operatively connected with the elevator and forming the control line connection to the holding means and operable by the control line to control the elevator.

21. In a model airplane having an airframe and a controlling elevator, an inertia device consisting of a substantially horizontal arm pivotally mounted at one end on the airframe for pivotal movement about a horizontal axis, a weight mounted on the free end of said arm, and resilient means comprising opposed spring elements acting on said arm and normally holding it resiliently in horizontal position, operative connections between the arm and the elevator to raise the elevator upon upward movement of the weight relative to the airframe and control lines, operatively connected with said resilient means and extending to an operator positioned on the ground, for varying the bias of said resilient means and thereby acting through the inertia device to provide continuous manual control of the elevator.

22. In a self propelled miniature aeroplane having a swingable rudder, means for moving the rudder to control the lateral movement of the craft in flight, said means including a control member mounted to move laterally of the craft, means for limiting the range of movement of said member, means for connecting said member to the rudder to move the rudder as said member is moved, elastic means normally holding said member in predetermined position but being yieldable to allow said member to move to another position, and a flexible line connected to said laterally movable member and extending to an operator positioned on the ground, predetermined tension on said line acting on said member to swing the rudder in a direction toward the operator and thereby steer the aeroplane in an approximately circular path around the operator, said elastic means tending to swing the rudder in the opposite direction when tension on the flexible line is slackened.

23. In a self propelled miniature aeroplane having a swingable rudder, a laterally movable control member on the craft, means connecting said control member to the rudder for simultaneous movement, yieldable means connected to said control member and normally holding said member and the rudder in predetermined position, a control line connected to said member and extending to an operator positioned on the ground to confine the line of flight of the aeroplane to an approximately circular course around the operator, predetermined tension on said control line acting on said member to swing the rudder in a direction toward the operator while said yieldable means tends to swing the rudder in the opposite direction.

24. In a self propelled miniature aircraft having a swingably mounted rudder, rudder actuating means connected to the rudder, a control line connected to the rudder actuating means and extending to an operator positioned on the ground, elastic means holding the rudder yieldingly in predetermined position when the control line is slack, tension on said line when taut acting through said actuating means to swing the rudder in a direction towards the operator to steer the aeroplane in an approximately circular course around the operator.

WILLIAM LOUIS EFFINGER, Jr.

REFERENCES CITED

The following references are of record in the file of this patent:

UNITED STATES PATENTS

| Number | Name | Date |
|---|---|---|
| 1,000,273 | Lobnitz | Aug. 8, 1911 |
| 1,035,795 | Kellogg | Aug. 13, 1912 |
| 1,154,396 | Hayot | Sept. 21, 1915 |
| 2,061,953 | Sampson | Nov. 24, 1936 |
| 2,100,934 | Berges | Nov. 30, 1937 |
| 2,292,416 | Walker | Aug. 11, 1942 |